CROSS-POINT SWITCHING SYSTEM

Filed Oct. 24, 1962 5 Sheets-Sheet 1

INVENTORS
ROBERT D. McCLAFLIN
TED N. TILMAN
BY John J. Leavitt
AGENT

INVENTORS
ROBERT D. McCLAFLIN
TED N. TILMAN
BY John J. Leavitt
AGENT

INVENTORS
ROBERT D. McCLAFLIN
TED N. TILMAN
BY John J. Leavitt
AGENT

CROSS-POINT SWITCHING SYSTEM

Filed Oct. 24, 1962 5 Sheets-Sheet 4

INVENTORS
ROBERT D. McCLAFLIN
TED N. TILMAN
BY John J. Leavitt
AGENT

CROSS-POINT SWITCHING SYSTEM

Filed Oct. 24, 1962 5 Sheets-Sheet 5

INVENTORS
ROBERT D. McCLAFLIN
TED N. TILMAN
BY John J. Leavitt
AGENT

United States Patent Office 3,260,967
Patented July 12, 1966

3,260,967

CROSS-POINT SWITCHING SYSTEM

Robert D. McClaflin and Ted N. Tilman, San Jose, Calif., assignors to Jennings Radio Manufacturing Corporation, San Jose, Calif., a corporation of Delaware Filed Oct. 24, 1962, Ser. No. 232,833
11 Claims. (Cl. 333—7)

This invention relates to transmission line switching systems, and particularly to switching systems suitable for use in switching between a multiplicity of antenna and transmitters.

One of the objects of the invention is to provide an open-wire cross-point switching system having increased versatility.

Another object of the invention is the provision of an open-wire cross-point switching system which eliminates the conventional manual patch boards, knife switches, and similar apparatus.

A still further object of the invention is the provision of an open-wire cross-point switching system which may be operated from a remote point.

A still further object of the invention is the provision of an open-wire cross-point switching module which may be conveniently combined with additional modules to provide increased switching capabilities between any number of antenna and transmitters.

A still further object of the invention is the provision of an open-wire balanced transmission line cross-point switching system enclosed within a dielectric housing to form a module which is protected from the elements.

A still further object of the invention is the provision of an open-wire balanced transmission line cross-point switching system in which contact arcing and impedance mismatch in the transmission lines are eliminated.

Still another object of the invention is the provision of an open-wire balanced transmission line cross-point switching system in which noise generation and intermodulation distortion due to retification of the RF signal is eliminated.

Another object of the invention is the provision of an open-wire balanced transmission line cross-point switching system in which vacuum switching elements are utilized to provide low resistance nonoxidizing contacts and constant balanced impedance through a cross-point or a multiplicity of cross-point.

A still further object of the invention is the provision of an open-wire balanced transmission line cross-point switching system which is broad-banded and capable of operating satisfactorily over a wide frequency spectrum without adjustment or tuning, for example, within the range of zero to thirty megacycles.

The invention possesses other objects and features of advantage, some of which, with the foregoing, will be apparent from the following description and the drawings. It is to be understood however that the invention is not limited by said description and the drawing, but may be embodied in various forms within the scope of the appended claims.

Broadly considered, the open-wire balanced transmission line cross-point switching system of the invention comprises an enclosed dielectric housing through which extend at least two transmission line portions at right angles to each other and spaced apart an appropriate distance. Each pair of open-wire transmission lines include a pair of substantially parallel vacuum switches both operable from a central point. Interconnecting one transmission line portion with the other are a plurality of sets of vacuum switches operated simultaneously with the parallel switches interposed in the transmission line conductors. By appropriate selective control of the vacuum switches, RF transmission may be effected independently through each transmission line, or alternatively, the two transmission line portions may be selectively interconnected at a cross-point for transfer of RF transmission from one line to the other. Control of the cross-point switching system is effected by suitable control means in conjunction with an appropriate motor and drive mechanism connecting the various vacuum switches so that either "through" transmission or cross-point transmission may be effected.

Referring to the drawings.

Figure 1:
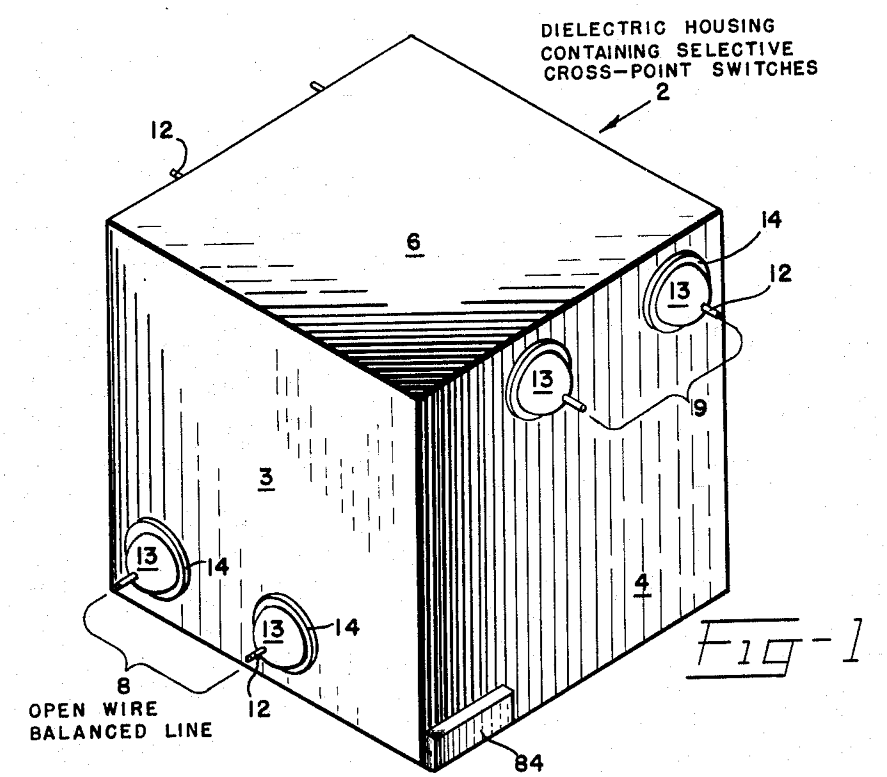
FIG. 1 is a perspective view illustrating the exterior of the housing enclosing the cross-point switching system or module.
Figure 2:
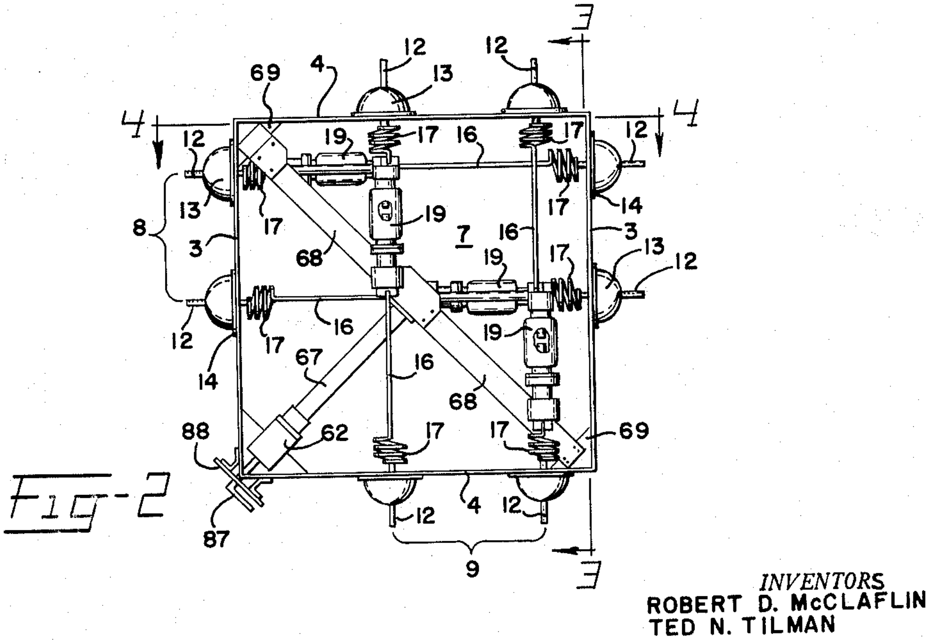
FIG. 2 is a plan view looking into the cross-point switching housing with the top cover removed.
Figure 3:
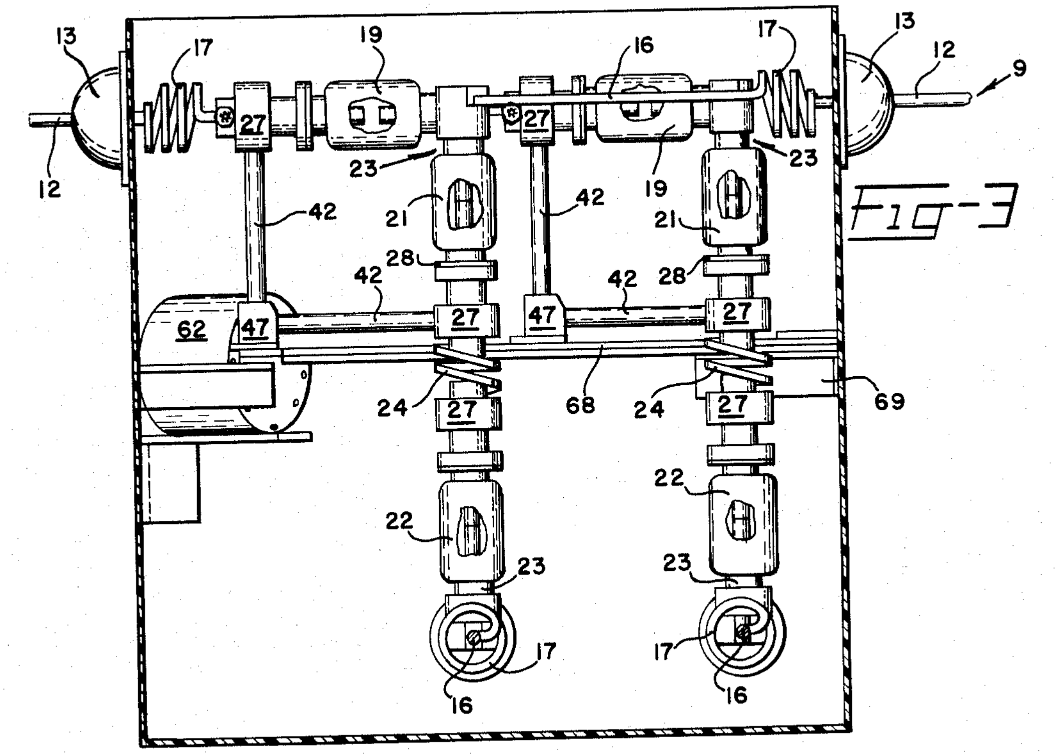
FIG. 3 is a vertical sectional view taken in the plane indicated by the line 3—3 in FIG. 2.
Figure 4:
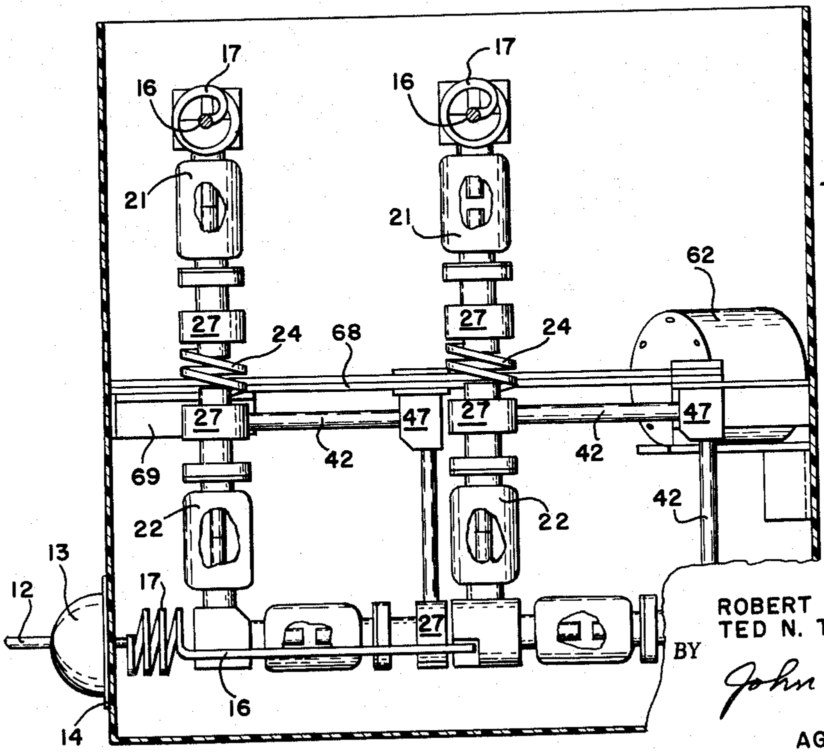
FIG. 4 is a vertical sectional view taken in the plane indicated by the line 4—4 in FIG. 2.
Figure 6:
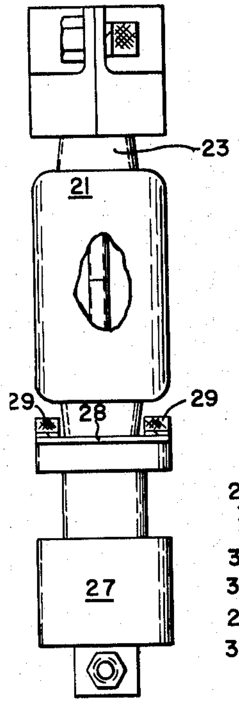
FIG. 6 is a side elevation of the switch assembly shown in FIG. 5.
Figure 5:
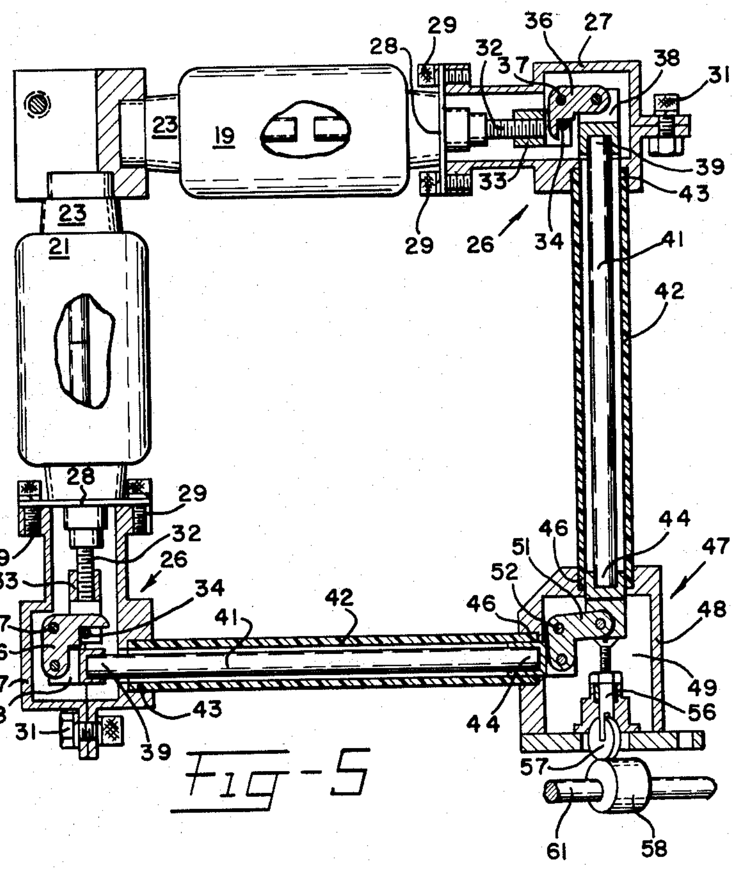
FIG. 5 is an enlarged view illustrating one of the switch modules utilized in the system and including a vacuum switch adapted to be inserted in the "through" transmission line and a vacuum switch forming part of the cross-point conductor. Portions of the structure are broken away to reveal underlying parts.
Figure 7:
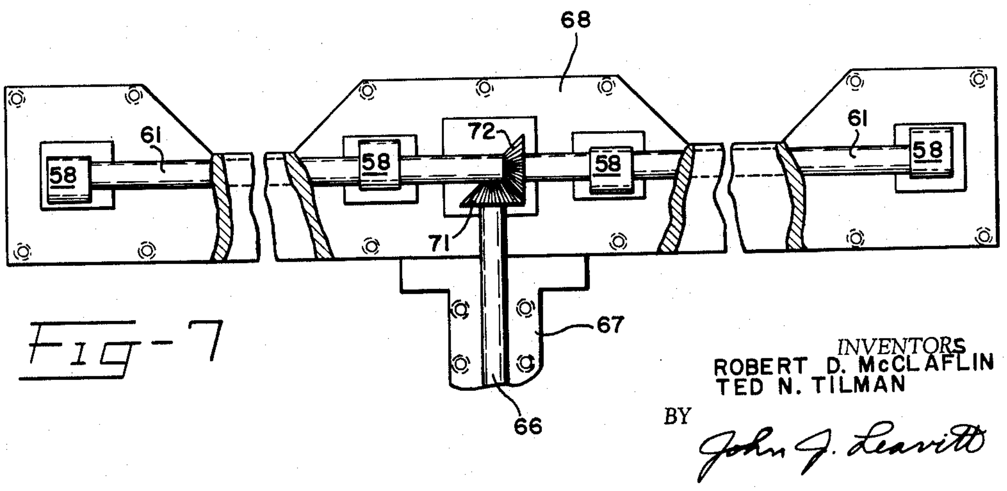
FIG. 7 is a plan view illustrating a portion of the mechanical control mechanism for actuating the vacuum switches. Portions of the structure are broken away to disclose the underlying parts and to reduce the size of the figure.
Figure 8:
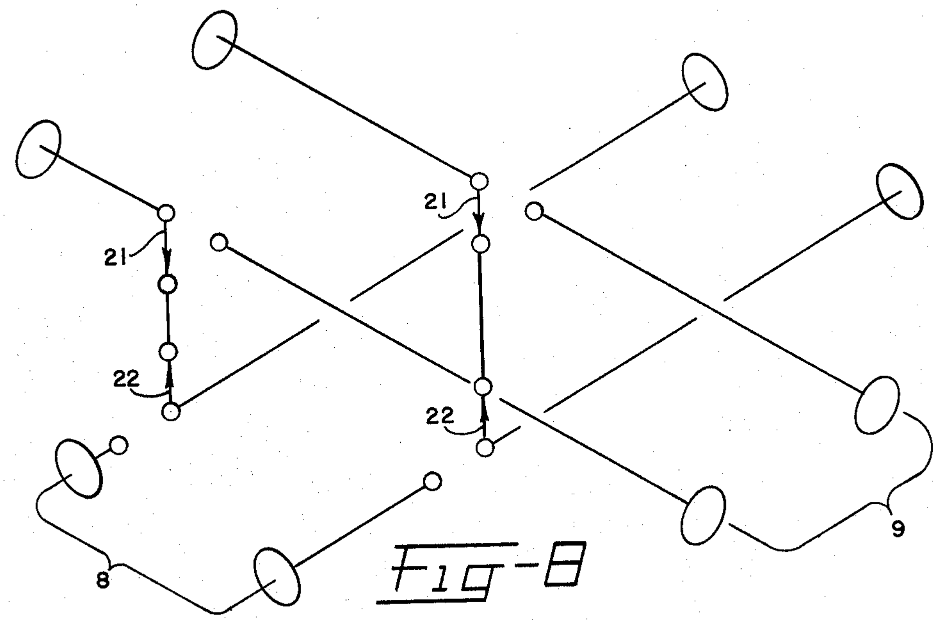
FIG. 8 is a line diagram illustrating the relationship of the transmission lines, and the relationship of the vacuum switches in the cross-point position.

FIGS. 1 and 2 are shown approximately one-tenth actual size, while FIGS. 3 and 4 are shown approximately one-fifth actual size. FIGS. 5 and 6 are drawn approximately one-third actual size, and FIG. 7 is drawn approximately one-half actual size.

In terms of greater detail, the open-wire balanced transmission line cross-point switching system of the invention comprises an enclosure or housing designated generally by the numeral 2 in FIG. 1, and including pairs of oppositely disposed side walls 3 and 4, and top and bottom walls 6 and 7 respectively. The housing is preferably fabricated from panels of a dielectric material such as resin impregnated or embedded fibre glass joined and re-enforced at adjacent edges in any suitable manner, as by re-enforcing angle bars (not shown) formed of a dielectric material and secured to the panels about their peripheral edges.

Extending transversely through the dielectric housing or enclosure are a plurality of pairs of parallel conductors, each pair constituting a transmission line portion and designated generally by the numerals 8 and 9, respectively. Each transmission line, shown best in FIG. 2, comprises a pair of parallel conductors spaced apart an appropriate distance and including a terminal portion 12 at each opposite end detachably secured to an insulator cup 13, which is in turn detachably secured to the associated side wall of the enclosure by a clamp ring 14. The terminal portion 12 includes a straight portion 16 extending into the housing and connected at one end to an inductance coil 17, also forming a part of the transmission line conductor. As show best in FIG. 2, the "through" conductors forming the transmission line portion 8 are substantial duplicates of each other, but are turned end-for-end so that with respect to each conductor, corresponding elements lie adjacent opposite walls 3. As shown best in FIG. 2, each conductor of transmission line portions 8 and 9 includes a pair of inductor coils arranged in series, with each inductor coil in each conductor being appropriately positioned adjacent an associated terminal portion 12. Interposed between the adjacent ends of the two inductor coils in each "through" conductor is a vacuum switch 19, interconnected so as to permit selective making or breaking of the continuity of each conductor. The mechanism for effecting opening and closing movement of the vacuum switches 19 will be hereinafter described in detail.

In order to form an electrically conductive connection between the transmission line portions 8 and 9, cross-point conductors connect corresponding "through" conductors of the two transmission line portions. Each cross-point conductor assembly comprises a pair of axially aligned and serially interconnected vacuum switch assemblies 21 and 22. The inter-relationship of the vacuum switches included in each cross-point conductor is shown best in FIGS. 3 and 4. As there illustrated, each vacuum switch of each cross-point conductor assembly has its fixed contact end 23 electrically connected to the associated "through" conductor of the transmission line portion, and each has its mobile end electrically interconnected with the mobile end of the other associated and aligned cross-point switch. An inductance coil 24 is operatively interposed between the adjacent mobile ends of vacuum switches 21 and 22, as shown best in FIGS. 3 and 4. Each of vacuum switches 21 and 22 constitutes one vacuum switch unit of a pair of such units making up a module (FIG. 5) associated with each transmission line conductor. There are thus four separate modules in the cross-point switching system illustrated, each module including a pair of vacuum switches having their fixed electrode ends interconnected, with each switch of the pair being open when the other is closed. This arrangement of the vacuum switches which make up each module, and the control mechanism therefore, is best shown in FIG. 5.

Figure 9:
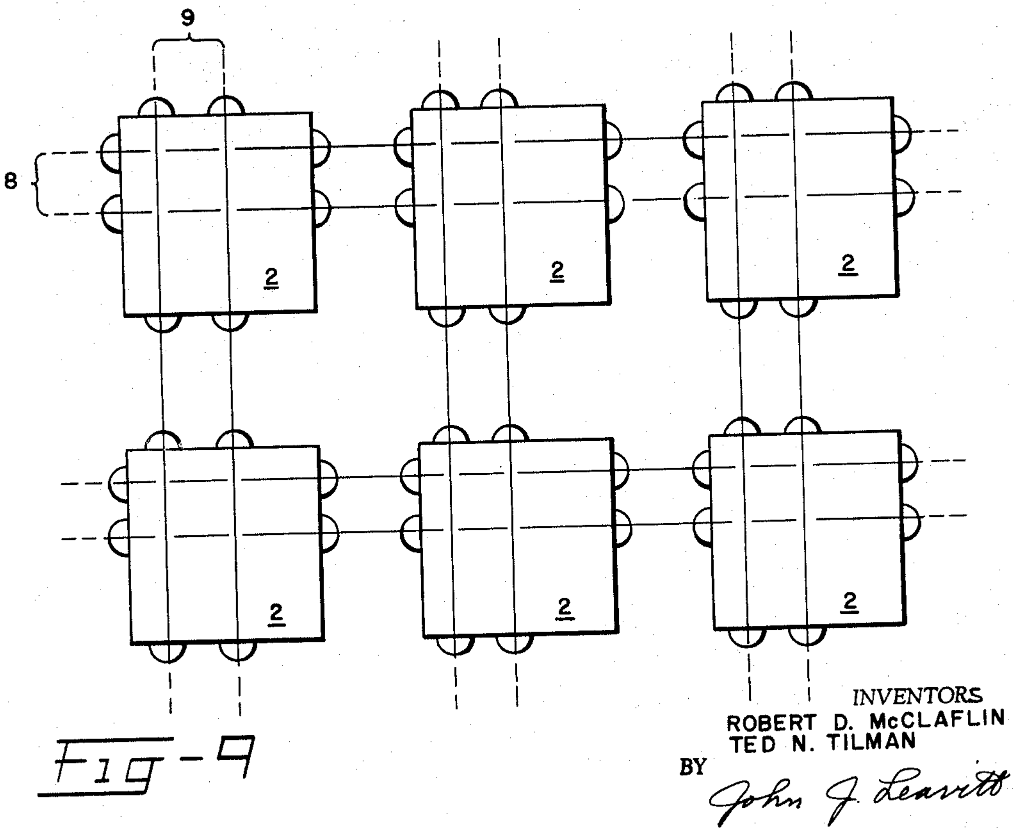
FIG. 9 is a line diagram in perspective illustrating the manner in which a multiplicity of open-wire balanced transmission line cross-point switch modules or assemblies according to the present invention may be combined to provide flexibility and selectivity of antenna and transmitter utilization.

The vacuum switches forming each module are arranged to operate independently of, but simultaneously with, the vacuum switches in each of the other three modules included in the cross-point switching system. The arrangement is such that when all of the cross-point conductor vacuum switches are in closed position, all of the vacuum switches in the "through" conductors of the two transmission line portions are in open position. This arrangement of the switches is the one that has been selected for illustration in the drawing. It will of course be understood that when all of the cross-point vacuum switches are opened, the vacuum switches included in the transmission line "through" conductors are simultaneously closed, and each transmission line portion is then independent of the other. In this manner any pair of transmission lines, or multiplicity of pairs of transmission lines, as indicated in FIG. 9, may be easily controlled from a remote point for versatile switching of various transmitters to various antenna.

In order to provide substantially simultaneous operation of the vacuum switches forming each module, a switch actuating mechanism is provided. This mechanism is illustrated best in FIG. 5 and comprises a vacuum switch actuator assembly designated generally by the numeral 26 including housing portion 27 detachably secured to vacuum switch flange 28 by suitable screws 29, and provided at its other end with a terminal connector bolt 31, which is also utilized to clamp the two halves of the split housing together. The actuator assembly is utilized also as a thrust member to facilitate opening and closing of the contacts of each vacuum switch.

Within each actuator assembly, the mobile and externally threaded stem 32 of each vacuum switch is provided with a suitable clevis 33, the clevis being provided with a cross-pin 34 adapted to be engaged by one arm of a bellcrank 36. The bellcrank is pivoted on the fulcrum 37, and is attached at its end opposite the pin 34 to a clevis 38 secured on the associated end 39 of a dielectric rod 41 extending at right angles to stem 32 of the vacuum switch. The dielectric actuating rod 41 is enclosed with a transparent insulating shield cylinder 42 having one end 43 fixed to the housing 27.

As shown in FIG. 5, the actuating rods 41 and shield cylinders 42 extending from each pair of associated switches making up a module extend toward each other so that the ends 44 of the actuating rods lie closely adjacent each other and are interconnected by an actuating mechanism hereafter described. The adjacent ends 46 of the insulating cylinders 42 on the other hand are securely fastened within a base or mounting housing designated generally by the numeral 47 in FIGS. 4 and 5, and comprises complementary metallic shell portions 48 which when assembled provide a hollow chamber 49 within which is pivotally mounted a bellcrank 51 having one arm connected to one of the actuating rods 41 and the other arm connected to the second actuating rod 41. A suitable pivot pin 52 is provided on which the bellcrank rotates in response to movement initiated by a push rod 56 connected at one end to one of the actuating rods 41. At its other end the spindle is provided with a cam follower 57 adapted to rid on cam 58, fixed on shaft 61 adapted to rotate upon actuation of the electric motor 62 shown best in FIG. 2.

It will be understood that when the motor 62 is actuated to rotate shaft 61, the high point or lobe on cam 58 will cause the push rod to move axially as seen in FIG. 5, resulting in the vertical rod 41 being moved upwardly and the horizontal rod 41 shown in FIG. 5 to move to the right. This will result in the switch 19 being closed so as to complete a circuit through the transmission line "through" conductor, and will simultaneously open the switch contacts of vacuum switch 21 forming a part of the cross-point conductor. When this occurs the cross-point switching system is in its "through" position, and it will require reactivation of the motor 62 to switch the system from the "through" position to the "cross-point" position. Inasmuch as each of the switching modules as illustrated in FIG. 5 is duplicated or repeated in the remaining structure, it is not believed necessary to describe the individual modules separately.

In order to actuate the four separate modules as they appear in FIG. 2, the motor 62 is connected to a suitable actuating assembly comprising a motor drive shaft 66 journaled in bearing plate 67 connected at one end to the motor housing, and connected at its other end to a transversely extending diagonal mounting bar 68 extending diagonally across the housing corner-to-corner and suitably supported at each end on mounting brackets 69 constituting gusset plates secured cornerwise in the housing by suitable screws.

Journaled on the mounting bar 68 are a plurality of transversely extending actuator rods 61 as described in connection with FIG. 5. Each of the rods 61 is provided therealong with cams 58 adapted to work on cam followers 57 to actuate the associated vacuum switches. The actuating rods 61 are suitably rotated by a spur gear 71 on the end of motor shaft 66. The gear 71, meshing with a drive gear 72, rotates the shaft 61 to simultaneously actuate the cam and cam follower structure in each switch module.

Figure 10:
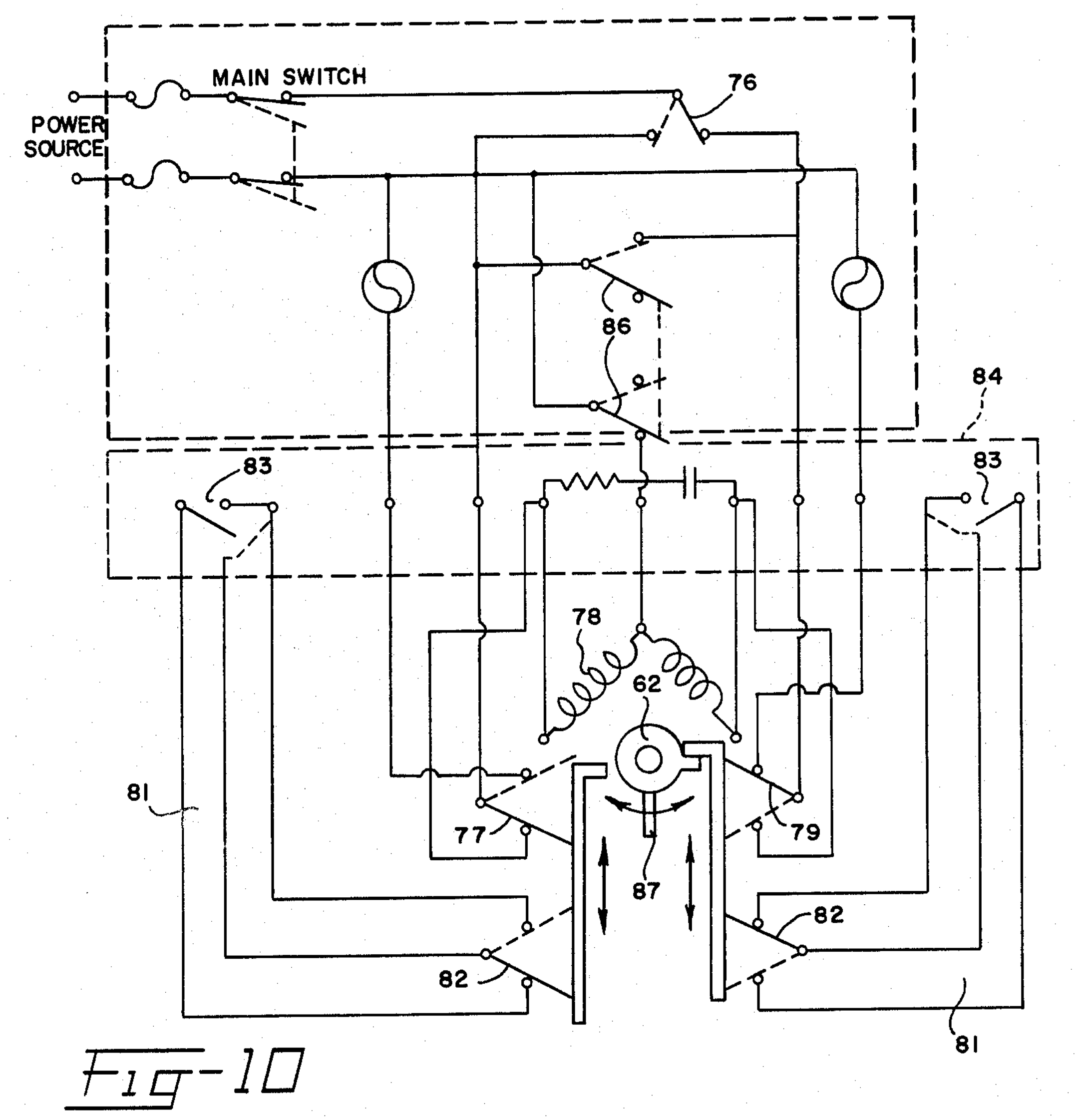
FIG. 10 is a wiring diagram of the control circuit for the open-wire balance transmission line cross-point switching system.

In operation, the motor is controlled by a circuit illustrated schematically in FIG. 10. The motor 62 is preferably of a type which rotates only 180 degrees and in opposite directions, so as to switch the cross-point system either from the "through" position to the "cross-point" position or vice versa. As indicated in FIG. 10, the motor is connected to an appropriate power source through a main switch, conveniently a double-pole single-throw type, shown here in the "on" position in full lines and in the "off" position in dash lines. From the main switch power is carried through appropriate leads to a single-pole double-throw remote control switch 76 shown in a position to energize the motor so as to complete a circuit through the "cross-point" conductors. To switch the system to a "through" condition, switch 76 is moved into the dash-line position so that power will flow through switch 77 and energize winding 78 of the motor.

Rotation of the motor through 180 degrees automatically throws motor control switches 77 and 79 into the dash-line positions shown. With switches 76, 77 and 79 in the dash-line position, the "through" conductors of the transmissions lines are energized and the "cross-point" conductors are de-energized. Auxiliary circuits designated generally by the numeral 81 and controlled by appropriate switches 82 actuated by rotation of the motor may be provided to perform any selected function. The terminal ends 83 of these auxiliary circuits are contained in a suitable terminal box 84 shown in FIG. 1 and as dash-line rectangle 84 in FIG. 10.

In some circumstances it may be desirable or necessary to effect manual actuation of the switching system. To accomplish this purpose a switch 86 is provided. In the position shown in full lines, the switch is set for remote operation. For manual operation the switch 86 is placed in its dash-line position and the motor is actuated by an appropriate crank or lever 87, shown schematically in FIGS. 2 and 10. As shown in FIG. 2, the crank extends outside the housing and is associated with a plate 88 printed with appropriate indicia (not shown) to indicate whether the system is in "through" condition or "cross-point" condition.

We claim:

1. An open-wire balanced transmission line cross-point switching system, comprising:

(a) a base structure for supporting and enclosing the switching system, (b) a plurality of multi-conductor transmission line portions supported on the base structure in spaced relation and arranged to cross one another, (c) conductor switch means serially interposed in each conductor of each multi-conductor transmission line portion and operable to make or break a circuit through the associated conductor, (d) cross-point conductor assemblies operatively interposed between corresponding conductors of adjacent transmission line portions, each cross-point conductor assembly including cross-point switch means operable to make or break a circuit between the associated corresponding conductors of adjacent transmission line portions, (e) transmission line inductance determining means interposed in each conductor of each transmission line portion to effect impedance matching between adjacent transmission line portions, and (f) control means operable to substantially simultaneously actuate said conductor and cross-point switch means to selectively make or break a circuit through adjacent transmission line portions.

2. The combination according to claim 1, in which said inductance determining means constitutes at least one coil interposed in each transmission line conductor.

3. An open-wire balanced transmission line cross-point switching system, comprising:

(a) a base structure for supporting and enclosing the switching system, (b) a plurality of multi-conductor transmission line portions supported on the base structure in spaced relation and arranged to cross one another, (c) conductor switch means serially interposed in each conductor of each multi-conductor transmission line portion and operable to make or break a circuit through the associated conductor, (d) cross-point conductor assemblies operatively interposed between corresponding conductors of adjacent transmission line portions, each cross-point conductor assembly including cross-point switch means operable to make or break a circuit between the associated corresponding conductors of adjacent transmission line portions, (e) transmission line inductance determining means interposed in each cross-point conductor assembly to effect impedance matching between said transmission line portions and the cross-point conductor assemblies, and (f) control means operable to substantially simultaneously actuate said conductor and cross-point switch means to selectively make or break a circuit through adjacent transmission line portions.

4. The combination according to claim 3, in which said inductance determining means constitutes at least one coil interposed in each cross-point conductor assembly.

5. An open-wire balanced transmission line cross-point switching system, comprising:

(a) a base structure for supporting and enclosing the switching system, (b) a plurality of multi-conductor transmission line portions supported on the base structure in spaced relation and arranged to cross one another, (c) conductor switch means serially interposed in each conductor of each multi-conductor transmission line portion and operable to make or break a circuit through the associated conductor, (d) cross-point conductor assemblies operatively interposed between corresponding conductors of adjacent transmission line portions, each cross-point conductor assembly including cross-point switch means operable to make or break a circuit between the associated corresponding conductors of adjacent transmission line portions, (e) control means operable to substantially simultaneously actuate said conductor and cross-point switch means to selectively make or break a circuit through adjacent transmission line portions, said control means including a reversible motor supported on the base structure, and (f) actuating means supported on the base structure and operatively interposed between the motor and both said switch means to open one switch means and close the other when the motor is energized.

6. The combination according to claim 5, in which said actuating means include bearing plates mounted on the base structure, a plurality of interconnected rods journaled on the bearing plates and connected to the motor for rotation therewith, rotatable cams on the rods, and a cam follower operatively associated with both said switch means to actuate the switch means upon rotation of the cams.

7. An open-wire balanced transmission line cross-point switching system comprising:

(a) a base structure comprising a hollow dielectric housing for supporting and enclosing the switching system;

(b) a plurality of multi-conductor open-wire transmission line portions supported on the base structure in spaced relation and arranged to cross one another;

(c) conductor switch means serially interposed in each conductor of each multi-conductor open-wire transmission line portion and operable to make or break a circuit through the associated conductor;

(d) cross-point conductor assemblies operatively interposed between corresponding conductors of adjacent open wire transmission line portions, each cross-point conductor assembly including cross-point switch means operable to make or break a circuit between the associated corresponding conductors of adjacent open-wire transmission line portions;

(e) and control means operable to substantially simultaneously actuate said conductor and cross-point switch means to selectively make or break a circuit through adjacent open-wire transmission line portions.

8. In a cross-point switching system having spaced pairs of open-wire balanced transmission line conductors arranged to cross one another, a plurality of switching modules operatively interposed between corresponding conductors of intersecting transmission lines, each switching module comprising a pair of switches with each switch of the pair having fixed and mobile contacts in axial alignment, the aligned contacts of one switch of each pair being arranged substantially perpendicular to the aligned contacts of the other switch of that pair, and actuating means operatively interconnecting the mobile contacts of each switching module to substantially simultaneously open one switch and close the other.

9. The combination according to claim 8, in which two switches in adjacent switching modules are axially aligned.

10. The combination according to claim 9, in which the mobile contact ends of the axially aligned switches are juxtaposed and electrically interconnected.

11. The combination according to claim 9, in which inductance means are interposed between said two axially aligned switches.

References Cited by the Examiner

UNITED STATES PATENTS

| | | | |
|---|---|---|---|
| 2,938,999 | 5/1960 | Etter | 333—7 |
| 2,958,053 | 10/1960 | Concelman | 333—7 |
| 3,009,118 | 11/1961 | Stinson | 333—7 |
| 3,016,496 | 1/1962 | Concelman | 333—7 |

HERMAN KARL SAALBACH, *Primary Examiner.*

G. TABAK, A. MORGANSTERN, *Assistant Examiners.*